United States Patent Office 3,353,937
Patented Nov. 21, 1967

3,353,937
COATED ALUMINUM COMPOSITION
AND PROCESS
James M. Ford, William M. Minish, and Philip J. Willis, Saltville, Va., assignors to Olin Mathieson Chemical Corporation
No Drawing. Filed June 8, 1964, Ser. No. 373,505
9 Claims. (Cl. 44—3)

This invention relates to a new and improved method for treating aluminum for use in compositions for the production of heat. The invention is particularly concerned with coating aluminum for use in the manufacture of a mixture of dry ingredients capable of reacting rapidly to liberate heat when admixed with water.

Mixtures of chemical agents for this purpose have long been in common use for supplying heat to so-called fireless cookers, for the cleaning of grease clogged drains and for other purposes in which the generation of heat is required. A mixture frequently employed for this purpose includes, as its essential heat-producing ingredients, aluminum and an alkaline agent such as sodium hydroxide or potassium hydroxide. The addition of water to the mixture causes the aluminum and alkali to react rapidly, producing both heat, gas and mechanical agitation.

Heat-producing mixtures of this type may, and preferably do, include, in addition to the principal heat-producing ingredients, such additional ingredients as may further the desired action, either to increase the production of heat or for other purposes incidental to the use for which the mixture is designed. For example, oxidizing agents, such as sodium nitrate, are commonly employed to react with the hydrogen released during the principal reaction. Catalytic agents, additional heat-generating agents, such as sodium chlorite, and inert ingredients acting merely as carriers or fillers, such as sodium chloride, may be employed. In general, whatever the constitution of the whole mixture, it is common practice to limit the aluminum content to a range of about 2 percent to about 8 percent by weight of the total composition. The alkaline agent is employed in an amount at least about twice that required for combination with the aluminum and often constitutes the major ingredient of the composition.

Exemplary compositions may contain:

| | Percent by weight |
|---|---|
| Caustic soda | 40 to 67 |
| Sodium chloride | 0 to 25 |
| Sodium nitrate | 20 to 40 |
| Sodium chlorite | 0 to 10 |
| Aluminum | 2 to 8 |
| Total | 100 |

Minor amounts, usually less than 1 percent, of colorants, for example, potassium permanganate, stabilizers and other components may be included.

Heat-producing compositions of the type described and which are improved by the process of the present invention are described, for example, in U.S. Patents 2,371,436; 2,773,040; 2,816,012; and 3,077,455.

In these mixtures, the aluminum is in divided form and may have variable composition including substantially pure aluminum, aluminum alloys and dross or other grossly impure forms of aluminum. Control of particle size is important to control the intensity of reaction and heat evolution, particularly the maximum temperature rise and duration of the elevated temperatures. A particularly advantageous form of aluminum for this purpose is cut wire, suitably from about 0.01 to 0.15 inch in diameter and from 0.05 to 0.25 inch in length. Ordinarily the maximum transverse dimension of suitable aluminum particles is about 0.25 inch. However, aluminum particles of lesser dimensions, for example, filings or powder, are not generally contemplated for the production of heat-producing compositions because of the undue violence of their reaction with water.

In these mixtures of the prior art, on storage and prior to use, intimate contact occurs between the aluminum particles and the other components of the drain cleaner including caustic soda, nitrate of soda, salt and permanganates. An undesirable mottled brown or green color frequently develops on the aluminum particles. A clean, frosty, white appearance of the aluminum particles in the drain cleaner is considered more desirable. Further, in the preparation of these mixtures, the application of the other components of the mixture directly with the aluminum is not readily carried out without hazard to operators and without clogging of subsequent screens and apparatus due to moisture pickup by the caustic which causes the particles to stick together. This invention avoids intimate contact between the aluminum particles and the other components of the drain cleaner mixture and avoids aggregating the aluminum particles. The aluminum particles, treated according to the present invention do not discolor on aging in storage in contact with other components of the mixtures.

The process of the present invention consists in applying a substantially uniform, adherent coating of soda ash to the aluminum particles and then mixing the thus coated aluminum particles with caustic soda and other components to form novel heat-producing compositions. In one aspect, therefore, the process of the present invention consists in applying a thin coating of soda ash to the aluminum particles by drying a vigorously agitated mixture of aluminum particles and a strong solution of soda ash.

The operation is most advantageously carried out feeding hot soda ash solutions substantially saturated at temperatures of 85° C. to 105° C. The aluminum may be preheated or fed at room temperatures and sufficient heat may be supplied to the reactor to effect the drying. A hot concentrated solution of sodium carbonate is most advantageous to reduce dust loss and to build a substantial and uniform, frosty white coating on the aluminum particles. The drying is advantageously carried out in a rotary kiln dryer wherein the mixture is tumbled to provide vigorous agitation but any suitable apparatus can be used. The evaporation and drying is carried out in the temperature range of 50° to 150° C. and preferably at 90° to 110° C.

The ratio of soda ash supplied in the form of concentrated solutions to aluminum is suitably from 2 to 6 pounds of $Na_2CO_3$ per 100 lbs. of aluminum in the form of particles. Preferably this ratio is about 4 to 5 pounds of $Na_2CO_3$ per 100 pounds of aluminum. The concentration of soda ash in solution can vary from more dilute to saturated concentrations at temperatures up to the boiling point of such solutions. More heat is required in the drier using more dilute solutions and less with the more concentrated solutions. Advantageously, therefore, the soda ash solutions contain a minimum of 20 percent of soda ash and preferably nearer the saturation value of about 45 to 50 grams of Na$_2$CO$_3$ per 100 grams of water, depending on the temperature. For example, a solution saturated at 190° F. (88° C.) containing 31.75% of Na$_2$CO$_3$ and having a specific gravity of approximately 1.296 is suitable. Substantially all of the water thus introduced is removed by evaporation in the drier and the product is obtained as dry, ash-coated, discrete aluminum particles.

While the preceding description is directed to aluminum particles coated with soda ash, which is the preferred embodiment of the invention, other alkali metal salts can be substituted for the soda ash with satisfactory results. Suitable alkali metal salts include potassium carbonate, phosphate and other sodium and potassium salts. Alkaline alkali metal salts which, in 1% aqueous solution, have a pH of about 9 to 12, preferably 11 to 12, are useful. These salts appear to be sufficiently alkaline to etch the aluminum and produce a satisfactory coating. Included among suitable alkali metal salts are:

Sodium carbonate
Potassium carbonate
Trisodium phosphate
Disodium hydrogen phosphate
Dipotassium hydrogen phosphate
Tripotassium phosphate
Tetrasodium pyrophosphate
Tetrapotassium pyrophosphate
Sodium tripolyphosphate
Sodium tetraborate.

Mixtures of alkali metal salts are also useful, for example:

Trisodium phosphate (20%)
Disodium hydrogen phosphate (80%).

The proportion of alkali metals salts to aluminum varies suitably from 1 to 10 pounds of dissolved salts per 100 pounds of aluminum though for soda ash 2 to 6 pounds per 100 pounds of aluminum is preferred.

Particular advantages of the ash-coated product of this invention include its uniform, clean, frosty white appearance which is not affected by intimate contact with caustic soda or other common components of heat-producing mixtures with which it is combined. The ash-coated particles remain discrete in the manufacturing process and show no tendency to agglomerate in storage under all ordinary conditions with or without further admixture with caustic or other components of heat-producing mixtures.

Example I

Aluminum wire clippings 0.051 inch in diameter and averaging 3/16 inch in length were fed at room temperature and at a rate of 44 pounds per hour together with 0.51 gallon per hour of saturated sodium carbonate solution, saturated at 85° to 90° C., to a gas fired rotary drier (11 r.p.m.). The flue gas temperature was about 360° C. Coated aluminum particles of excellent appearance, frosty white and uniformly coated were extracted from the drier at a temperature of 95° C.

Example II

Bits of aluminum wire 0.051 inch in diameter by 3/16 inch in length were fed at 0.945 lb. per minute at room temperature into a gas-fired rotary drier together with a measured volume of soda ash solution saturated at 90° C. The solution was fed at the rate of 0.0123 gallon per pound of wire. Uniformly coated aluminum wire bits with a frosty white appearance were extracted at 85° C. an no operating difficulties were encountered.

Example III

Aluminum wire clippings 1/8 inch in length and 0.060 inch in diameter were coated with soda ash by the procedure of Example I. A heat producing composition was prepared by mixing the ash-coated aluminum particles with granular components in approximately the proportions indicated in the following table:

| Component: | Percent by weight |
|---|---|
| Aluminum, ash coated | 6 |
| Caustic soda | 61 |
| Sodium chloride | 2 |
| Sodium nitrate | 31 |
| Potassium permanganate | Trace |
| Total | 100 |

The screen analysis of the mixture was as follows:

| Mesh: | Percent retained |
|---|---|
| +12 | 7.3 |
| +14 | 15.4 |
| +20 | 64.7 |
| +35 | 92.1 |
| −35 | 7.9 |

In a heat rise test in which 28 grams of this product was added without stirring to 150 ml. of water at about 70° F. in a 250 ml. graduate having a thermometer suspended with the bulb at the 10 ml. level, the following data were obtained:

| Time, min.: | Temp., ° C. |
|---|---|
| 0.5 | 95 |
| 1 | 97 |
| 3 | 96.8 |
| 5 | 95.5 |
| 15 | 74.5 |

Example IV

A hot, saturated solution of potassium carbonate was mixed with aluminum wire clippings 0.060 inch in diameter and averaging 1/8 inch in length. The mixture was dried to produce aluminum particles having a gray coating.

Example V

The procedure of Example IV substituting for the potassium carbonate, a mixture of 20% by weight of trisoduim phosphate and 80% of dissodium hydrogen phosphate gave essentially similar results.

What is claimed is:

1. Process for coating aluminum particles with alkaline alkali metal salts to form discrete aluminum particles having thereon an adherent coating of said salts by the steps of mixing said aluminum particles with an aqueous solution of said salts in the proportion of from 1 to 10 pounds of said salts per 100 pounds of aluminum particles, drying the resulting mixture with agitation at temperatures of 50° to 150° C. and recovering the resulting discrete salt-coated aluminum particles.

2. Process according to claim 1 in which said aluminum particles have a maximum transverse dimension of 0.25 inch.

3. Process according to claim 1 in which said aqueous solution is an aqueous solution of soda ash and said proportion is from 2 to 6 pounds of soda ash per 100 pounds of aluminum particles 4. Process according to claim 3 in which said aqueous solution contains a minimum of 20 percent of soda ash.

5. Process according to claim 1 in which said aluminum particles are cut wire having a diameter of 0.01 to 0.15 inch and a length of 0.05 to 0.25 inch, said aqueous solution of soda ash contains 45 to 50 grams of soda ash per 100 grams of water, the proportion of soda ash to aluminum is from 4 to 5 pounds of soda ash per 100 pounds of aluminum and the drying temperature is between 90° and 110° C.

6. Discrete aluminum particles having a uniform, adherent coating of alkaline alkali metal salt, said coating amounting to 1 to 10 pounds per 100 pounds of aluminum.

7. Discrete aluminum particles having a uniform, adherent coating of soda ash, said coating amounting to 2 to 6 pounds per 100 pounds of aluminum.

8. A heat-producing composition consisting essentially of—

| Component: | Percent by weight |
|---|---|
| Caustic soda | 40 to 67 |
| Sodium chloride | 0 to 25 |
| Sodium nitrate | 20 to 40 |
| Sodium chlorite | 0 to 10 |
| Aluminum | 2 to 8 |
| Total | 100 | said aluminum being in the form of discrete particles having a uniform adherent coating of alkaline alkali metal salt, said coating amounting to 1 to 10 pounds per 100 pounds of aluminum.

9. A composition according to claim 8 in which said coating is soda ash and amounts to 2 to 6 pounds per 100 pounds of aluminum.

References Cited

UNITED STATES PATENTS

| 1,126,055 | 1/1915 | McNabb et al. | 44—3 X |
| 1,751,213 | 3/1930 | McCulloch | 117—128 |
| 2,279,589 | 4/1942 | Grant | 44—3 |
| 2,311,623 | 2/1943 | Blackmun et al. | 252—103 X |
| 2,676,153 | 4/1954 | MacMahon | 252—157 |
| 2,816,012 | 12/1957 | Walton et al. | 44—3 |
| 3,185,648 | 5/1965 | Standish et al. | 252—70 |

DANIEL E. WYMAN, *Primary Examiner.*

C. F. DEES, *Assistant Examiner.*